Sept. 5, 1933. D. H. REED 1,925,404
OUTSIDE PIPE CUTTER
Filed Jan. 12, 1929 2 Sheets-Sheet 1

Dempson H. Reed INVENTOR.

BY Jesse R. Stone

ATTORNEY.

Sept. 5, 1933.  D. H. REED  1,925,404
OUTSIDE PIPE CUTTER
Filed Jan. 12, 1929   2 Sheets-Sheet 2

Dempson H. Reed  INVENTOR.
BY  Jesse R. Stone
ATTORNEY.

Patented Sept. 5, 1933

1,925,404

UNITED STATES PATENT OFFICE 1,925,404

OUTSIDE PIPE CUTTER

Dempson H. Reed, Houston, Tex., assignor of one-half to James S. Abercrombie, Houston, Tex.

Application January 12, 1929. Serial No. 332,003

12 Claims. (Cl. 81—189)

My invention relates to pipe cutters for cutting pipe in wells and is more specifically a cutter of this character adapted to cut the pipe from the outside.

In devices of this kind where a pipe is broken off in the well, such as a drill stem or other similar pipe, the pipe is withdrawn, if it can be lifted, but if it can not be removed from the well as a continuous string it may be removed in sections by telescoping a cutter down over the outside of the pipe which is lodged in the well and the cutter is employed to cut the pipe through from the outside so as to remove the same in sections.

Devices of this character have been previously devised but in most of them it is difficult, if not impossible, to release the pipe engaged by the cutter where it is found that it can not be removed after the pipe has been severed, or partially severed. The present invention is in the nature of an improvement upon the structure shown in my Patent No. 1,834,071, granted December 1, 1931.

It is an object of this invention to provide an outside pipe cutter, which is capable of engaging over the pipe in the well, and to cut the same and also to remove the section which has been severed, and to provide, in combination with a cutter of this character, a pipe engaging means which is capable of release where the pipe can not be removed after it has been cut, or before the cut is completed.

It is also desired to provide a cutter to engage and sever the pipe in a device as herein set forth and in which the cutters are held positively against engagement with the pipe until the tool has been placed and contacts the pipe in the desired position.

It is also an object to provide a cutter which is adapted to most effectively engage and sever the pipe when the device is rotated.

Another object of my invention is to provide a device with such an arrangement of parts that the cutter blades will not be released to contact the pipe until a predetermined amount of rotation has taken place.

A still further object is to so construct the device so that the cutter blades remain latched after the dogs have engaged under a coupling and require an additional operation before they are released.

Other objects of the invention lie in the construction of a simple compact device, the invention residing in the particular arrangement of the parts. The invention will be readily apparent to those skilled in the art to which it appertains when the following description is considered in connection with the accompanying drawings wherein.

Figure 1:
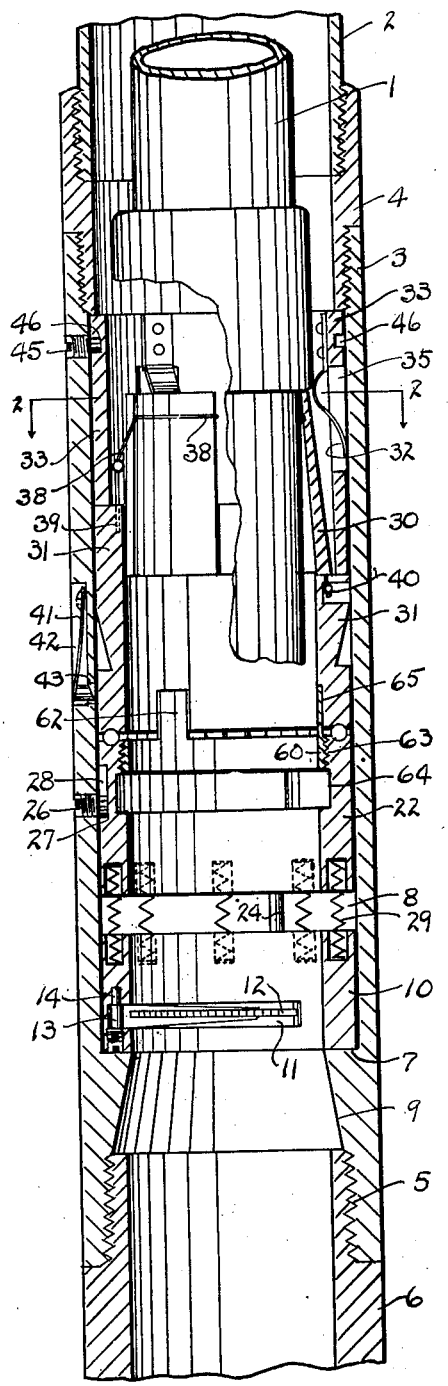
Fig. 1 is a central longitudinal section of my improved device showing it in contact with a coupling of the pipe to be removed.

As previously stated, the device is adapted to be set down over the upper end of the pipe which is to be cut. In the drawings a broken pipe section is shown at 1, and it is to be understood that this section may be of any length. The cutter is mounted at the lower end of a drill stem 2, the device being enclosed within a tubular housing 3 connected with the drill stem by means of a coupling or collar 4. The said housing 3 is threaded at its lower end 5 for connection with the head 6 of the pilot, which may be of any desired construction or similar to that described in my co-pending application, Serial No. 321,052, filed November 22, 1928. Adjacent the lower end of the housing the inner wall is extended inwardly to provide a shoulder 7 marking the lower boundary of a chamber 8 within the housing 3, in which my cutting mechanism is adapted to operate. Below the shoulder 7 the inner wall of the housing is flared downwardly at 9 to guide the pipe upwardly into the cutting head.

Figure 5:
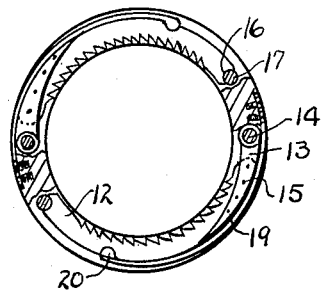
Fig. 5 is a section taken on the line 5—5 of Fig. 3 showing the blades in plan view.
Figure 6:
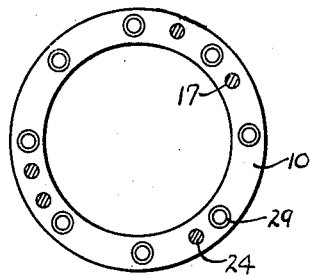
Fig. 6 is a plan view looking down on the blade carrying ring and showing the distribution of the parts therein.
Figure 8:
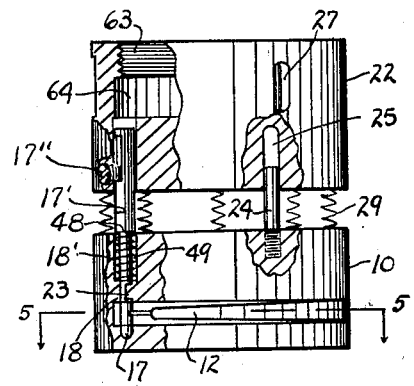
Fig. 8 is an elevation partly broken away to show the assembly of the dowel and latch pins.

The ring 10, upon which the cutters are mounted, is seated upon the shoulder 7 and fits closely within the inner wall of the housing. This cutter ring has a plurality of cutting blades mounted therein. I have shown two such blades mounted in opposite slots 11 in the ring. These blades 12 are connected at one end to hinge plates 13 pivotally mounted upon bolts or pins 14, set upwardly from the lower end of the ring 10. The cutter blades are connected with the hinge plates 13 by means of rivets 15, or otherwise. The ends opposite the hinged ends of the blades are formed with notches 16 therein, in which are engaged latch pins 17. Said pins are extended downwardly from above the upper side of the ring, as shown best in Fig. 8, and are slidable in the ring within the passage 18. Said cutter blades may or may not have saw teeth thereon. They are adapted to be thrown inwardly toward the pipe by springs 19 mounted in the said slots 11 in the ring adjacent the pivoted end of the blades. Said springs are curved to bear against the cutter blades at the forward ends of said springs, as shown at 20 in Fig. 5. When the blades are released from their connection with the latch pin 17 they will be swung on the pivots 14 inwardly against the pipe.

Above the cutter ring with the cutters therein is placed a collar 22. It is slidable in the housing and is adapted to expose the upper ends of the pins 17 when it is forced downwardly. The pins 17 are free to slide in the lower side of the collar in the openings or recesses 70 but are prevented from rotating by the co-operation of a flat side 17' on each pin with a set screw 17" which is carried by the collar 22. The pins 17 extend downwardly through the openings 18 therein, as previously noted. Each pin 17 adjacent where it passes into the ring 10 is shown as reduced in diameter to provide a shoulder 48. The passage 18 is enlarged at its upper end as at 18' to receive a small coil spring 49 adapted to bear against the shoulder 48. In this manner the pin is normally retained in raised position. The operation of these pins will be later described. In the side of said trip pins, adjacent the ends of the saw blades, are notches 23. The notches are extended part way through the diameter of the pin and when the pins have been pushed downwardly from the latching position shown in Fig. 8 the notches 23 will come into registration with the ends of the cutter blades so as to release said blades, allowing the springs to throw the blades free of the latch pins and into engagement with the pipe. There are two of these latch pins, one for each cutter blade. I contemplate holding the cutter ring and the collar 22 in vertical registration by means of dowel pins 24, secured in the cutter ring and extending upwardly into recesses 25 extending part way through the collar 22. The ring 10 and collar 22 are held from rotation relative to the housing by means of pins 26 secured through the wall of the housing and having the forward end 27 thereon fitting within longitudinal slots or recesses 28 in the outer walls of the trip ring. I may have as many of these pins fitting within the slots 28 as may be necessary to communicate a rotating movement from the housing to the collar and the cutter ring. The collar and ring are held normally in spaced relation by means of tension springs 29 fitting within opposite recesses in the two rings, as will be noted particularly from Figs. 1 and 8.

Figure 2:
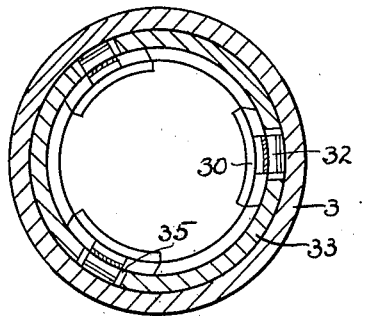
Fig. 2 is a section on the line 2—2 of Fig. 1 to illustrate the position of the dogs.
Figure 3:
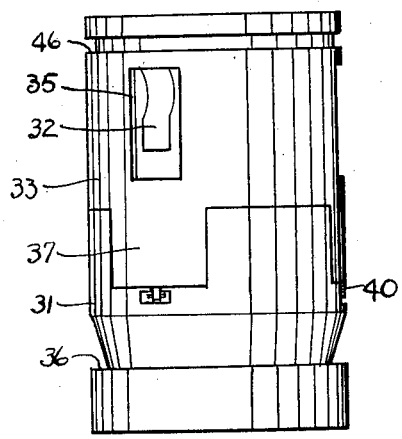
Fig. 3 is a side elevation of the dog collar and its co-operating ring.
Figure 4:
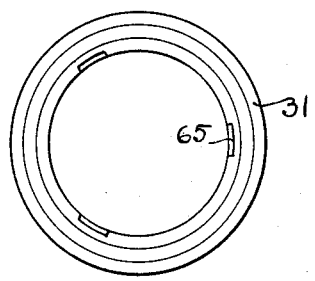
Fig. 4 is a bottom plan view of the dog collar showing the ball raceway therein.

The device is adapted to engage with the pipe to be cut through means of dogs 30 mounted upon an anchor sleeve 31, mounted for rotation above the collar 22. The said sleeve 31 has a plurality of beveled recesses in the upper end thereof to receive the lower ends of the dogs 30. I have shown three such dogs in this embodiment. Each dog is arcuate in shape, as shown from Fig. 2. The upper ends thereof are inclined inwardly toward the pipe 1, which is to be engaged, by means of springs 32, secured upon a co-operating spring supporting collar 33. The side walls of the anchor sleeve 31 are extended above the base of the dogs on each side of said dogs, while the lower end of the spring supporting ring is formed with downwardly extending arms 37 adjacent said dogs. Above the arms 30 the spring supporting sleeve 33 is recessed at 35 to provide space for the spring 32 to extend outwardly against the inner wall of the housing. Below the anchor dogs the sleeve 31 is provided with a groove, the lower side of which is formed with a shoulder 36, the wall of the groove above this shoulder being inclined outwardly and upwardly.

The dogs 30 are held normally inwardly toward the pipe 1 by the springs 32, as previously noted. They are under tension from the inner sides by springs 38, shown best in Fig. 1. These springs are secured at 39 in holes bored within the upper end of the sleeve 31. These springs are of ordinary construction and are weaker than the outer springs 32, but when the said dogs are relieved from the pressure of springs 32 springs 38 tend to force the dogs back outwardly on their lower pivots shown at 40. The housing 3 has in its outer wall a recess 41 in which there is a spring pressed dog 42 secured within said recess and having its lower end adapted to pass through an opening 43 to engage against the outer surface of the sleeve 31. The spring 41 is under tension, tending to force the dog through the opening 43 to engage above the shoulder 36 in the sleeve and when said sleeve has been properly depressed this engagement will take place automatically, preventing the upward movement of the sleeve 31 thereafter. The spring supporting sleeve 33 is held against downward movement by engagement of pins 45 in the housing 3 within a peripheral groove 46 in said sleeve 33.

Figure 7:
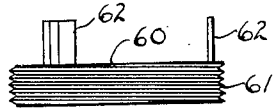
Fig. 7 is a side elevation of the blade releasing ring and illustrating the means by which it is rotated.

I have provided a novel device for releasing the latch pins 17 which is independent of any longitudinal movement or pressure upon the drill stem, housing or pipe which is to be severed. Fig. 7 shows what may be termed a latch releasing ring 60 which is threaded on its exterior at 61 and is provided with a plurality of upwardly extending lugs 62. This ring may be also seen in Fig. 1 and is adapted to be screwed into the top of the collar 22. The collar 22 is provided with threads 63 for a short distance down from the inner side thereof and has a slightly larger annular groove 64 directly below the threads. The sleeve 31 is provided with cutout portions 65 to receive the lugs 62.

In the operation of my device the parts are assembled, as shown in Fig. 1, with a pilot or bit head at the lower end of the housing. The device may be thus inserted downwardly into the hole or, and, if any material has fallen into the hole or lodged about the pipe which is to be cut, the device may be rotated to cut away the material, which may be washed away by the flushing fluid as is usual in drilling. When the device has been telescoped downwardly over the upper end of the pipe 1 a sufficient distance it may be drawn upwardly relative to the said pipe 1 until the dogs 30 engage beneath a collar upon said pipe. The springs 32 will hold said dogs in position to thus engage the pipe. Further upward movement of the device will cause the dog supporting sleeve 31 to be depressed while the spring supporting sleeve 33 will remain stationary. The depression of the sleeve 31 will eventually move it into position where the latching dog 42 will engage above the shoulder 36 and hold it in depressed position. As the sleeve 31 moves downwardly it will carry with it the collar 22 against the pressure of the springs 29.

Figure 9:
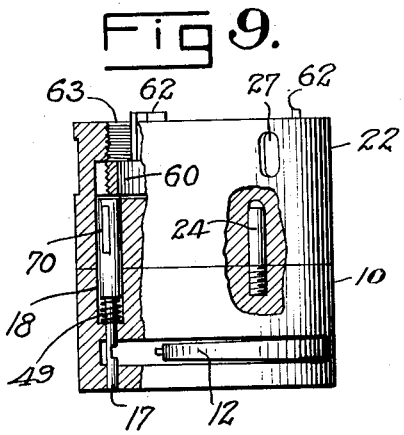
Fig. 9 is an elevation partly broken away to show the assembly of the dowel and latch pins in position after the blade has been released.

The device may then be rotated in a righthand direction and it will be seen that rotation of the collar 22 with respect to the release ring 60, will cause the ring to travel downwardly due to the threads 61. This rotation is performed after the dogs 30 have engaged the coupling so that the sleeve 31 will be held immovable and due to the lugs 62 which will hold the ring 60 from rotation after the collar 22 and ring 10 have been compressed toward each other as just described. The latch pins 17 are therefore projecting into the cavity 64 and will be moved down by the release ring 60 as it moves downwardly to the position of Fig. 9. The openings 23 are thus lowered so that the ends of the blades 12 are released and the teeth upon the cutters will engage the pipe under the pressure of the springs 19 and will rapidly cut through the pipe, severing the upper section, which may then be removed. During this rotation the lower cutting ring and collar 22 will rotate with the housing and the release ring 60 soon passes into the annular groove 64 after it has served its function, while the anchor supporting sleeve 31 will be held stationary, the dogs engaging the stationary pipe 1, which is being severed. In their lower depressed position the dogs 30 are below the springs 32 and relieved from pressure of said springs. The inner springs 28 will tend to throw the dogs outwardly when the frictional engagement between said dogs 30 and the collar on the pipe 1 has been relieved. The upward tension on the pipe 2 will be continued, however, during the rotation of the pipe so that the dogs will be held in the position engaging the pipe and when the pipe has been fully severed so that the upper section may be raised, the tension on the pipe will tend to draw the severed portions upwardly so that it may be removed from the well. If, however, it cannot be removed for some reason, due to the fact that it has not been properly severed or the blades have been broken so that the cut can not be completed, the drill stem may be dropped slightly so as to release the frictional engagement with the pipe 1 and the collar thereon, and the springs 38 will then act to throw the dogs outwardly away from the pipe 1 and allow the device to be removed from the well, leaving the pipe 1 in the hole.

The advantages of this construction lie in the positive manner in which it may operate without danger of failure in the well and in the fact that it may be released and withdrawn, if desired, without removing the severed section of pipe. The particular pilot which I employ may be of any cheap and economical construction which is effective in cutting away material so that the cutter itself may be employed in severing the pipe. Further advantages of the construction will be obvious to those skilled in the art.

What I claim as new and desire to protect by Letters Patent is:

1. In an outside pipe cutter, a tubular housing, a cutter ring supported therein, cutters thereon, a collar above said ring, a pipe-engaging stop means above said collar, dogs on said stop means, spring means tending to force said dogs inwardly, means to retract said dogs when said dogs are moved downwardly relative to said spring means, and means to move said cutters inwardly operable through the relative rotation of said dogs and said cutters.

2. In an outside pipe cutter, a tubular housing, a cutter ring supported therein, cutters thereon, a collar above said ring, a latch pin on said collar holding said cutters normally retracted, a pipe-engaging stop means above said collar, dogs on said stop means, springs means tending to force said dogs inwardly, means to retract said dogs when said dogs are moved downwardly relative to said spring means, and means to move said cutters inwardly operable through the relative rotation of said dogs and said cutters.

3. In an outside pipe cutter, a tubular housing, a cutter ring held against downward movement therein, horizontally movable cutters therein, means to normally restrain said cutters from inward movement, pipe-engaging means longitudinally movable in said housing, and means actuated by movement of said pipe engaging means and upon rotation of said housing to release said restraining means.

4. In an outside pipe cutter, a tubular housing, a cutter ring held against downward movement therein, horizontally movable cutters therein, means to normally restrain said cutters from inward movement, pipe-engaging means longitudinally movable in said housing, and means actuated by said pipe engaging means to release said restraining means upon rotation of said housing, and means to move said cutters resiliently inwardly.

5. In an outside pipe cutter, a tubular housing, a cutter ring held against downward movement therein, horizontally movable cutters therein, means to normally restrain said cutters from inward movement, pipe-engaging means longitudinally movable in said housing, means actuated by rotation of said housing to release said restraining means and movement of said pipe engaging means, means to move said cutters inwardly about a vertical axis, and means to rotate said housing and cutters.

6. In an outside pipe cutter, a tubular housing, a cutter mounted therein, said cutter comprising an arcuate blade, saw teeth on said blade, releasable means to hold said blade from inward movement, a ring movable longitudinally upon rotation of said housing whereby said releasable means is moved longitudinally to free said cutter, and means tending to force said blade inwardly.

7. In an outside pipe cutter, a tubular housing, a cutter mounted therein, said cutter comprising an arcuate blade, means tending to force said blade inwardly, and means to hold said blade from inward movement releasable through rotation thereof to cause longitudinal movement.

8. In a pipe cutter, a housing, means in said housing to engage the pipe to be cut, and blades carried by said housing, and locking means for said blades adapted to be released upon relative rotation of said housing and said pipe engaging means.

9. In a pipe cutter, a tubular housing, a sleeve therein, pipe engaging dogs carried by said sleeve, pipe cutters adapted to rotate with said housing, and releasable means interengaging said sleeve and said housing to unlatch said cutters upon relative rotation of said sleeve and said housing.

10. In a pipe cutter, a tubular housing, a sleeve therein, pipe engaging dogs carried by said sleeve, pipe cutters adapted to rotate with said housing, and releasable means interengaging said sleeve and said housing to unlatch said cutters upon rotation of said housing, said means including a ring restrained from rotation by said sleeve and threaded to move longitudinally upon rotation of said housing, and pins slidable by said ring.

11. In a device of the character described, in combination with a drill pipe cutter including an operating pipe and lock prongs, a band secured in the operating pipe, a supporting ring rotatably mounted on the said band, the said supporting ring having grooves in its inner wall to receive the said lock prongs the said supporting ring also having a plurality of slots in its inner and upper margin, and a plurality of supporting fingers pivotally mounted in the said slots in the supporting ring.

12. In a device of the character described, in combination with a drill pipe cutter including an operating pipe and lock prongs, a band secured in the operating pipe, a supporting ring rotatably mounted on the said band, means on the said supporting ring to receive the said lock prongs, and supporting fingers pivoted to the said supporting ring.

DEMPSON H. REED.